April 11, 1950     M. H. DOEBERT     2,503,473

TOOL FOR APPLYING TRACTION DEVICES ON WHEELS

Filed May 27, 1946

INVENTOR.
Martin H. Doebert
BY Popp & Popp
Attorneys.

Patented Apr. 11, 1950

2,503,473

UNITED STATES PATENT OFFICE 2,503,473

TOOL FOR APPLYING TRACTION DEVICES ON WHEELS

Martin H. Doebert, Buffalo, N. Y.

Application May 27, 1946, Serial No. 672,369

1 Claim. (Cl. 81—15.8)

This invention relates to a tool for applying a traction device to the perimeter of the driving wheels of automobiles and the like and the object is to provide a tool for this purpose which can be securely and easily attached to the strap of such device and enable the latter to quickly and conveniently draw around the peripheral part of a wheel during the operation of securing the traction device to the wheel.

A tool of this character is shown in application for United States patent filed February 17, 1945, and serially numbered 578,408, now Patent No. 2,438,547, issued March 30, 1948, the present invention being an improvement on the tool forming the subject of this prior application.

In the accompanying drawings.

In the following description similar reference numerals indicate like parts in the several views of the drawings.

Figure 1:
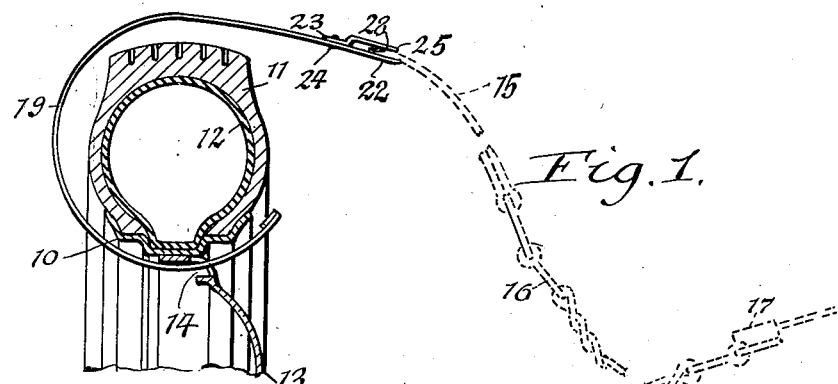
Fig. 1 is a fragmentary cross section of the perimeter of an automobile wheel showing one stage of the operation of applying a traction device thereto by the tool embodying this invention.

Although this tool may be used for applying a traction device to the perimeter of wheels which may be variously constructed, that form of wheel shown in Fig. 1, as an example of one type to which traction devices may be applied by this tool, comprises a circular rim 10, a tire mounted on the periphery of this rim and including an outer shoe 11 of horseshoe form in cross section and an air tube 12 arranged within the shoe and adapted to be inflated, and a disk 13 extending across the space within the rim. This disk is provided adjacent to the rim with a plurality of slots 14 which are arranged at intervals in a circular row and each of which is adapted to receive the flat attaching strap 15 of a traction device which is applied to the perimeter of the wheel in order to enable the latter to obtain a firm grip on the ground when the road is muddy or slippery or otherwise difficult to traverse. The complete traction device of which the strap 15 forms a part includes other various elements such as a gripping member 16 having preferably the form of a chain one side of which is permanently connected with the fixed end of the attaching strap and the other side of which is provided with a coupling buckle 17 whereby the gripping chain may be detachably connected with the opposite free end of the attaching strap.

As is well known this traction device when in use forms a ring which encircles the perimeter of the wheel so that the gripping chain is on the periphery of the tire shoe and the attaching strap traverses the slot of the disk and the coupling buckle 17 is on the outer or front side of the wheel. For the purpose of permitting the traction device applying tool of this invention to be used in connection with this device the free end part of the strap is provided with a hole or perforation 18 extending through this strap from one flat side of the same to the other between the longitudinal edges thereof.

The tool embodying this invention for applying this traction device to the perimeter of a wheel is constructed as follows:

The numeral 19 represents the body of the applying tool which is made of spring metal, preferably steel, in the form of a longitudinal strip having a width less than the width of the slot 14 in the wheel disk so as to be capable of moving transversely through the same. This body is made so that its resilience tends constantly when free to assume the form of a coil.

At its rear end this body is provided with a cross bar 20 which is pivoted thereto by a rivet 21 so as to enable the cross bar to be used as an instrument for removing ice or dirt which may be present in the slots 14 and also form a handle whereby the tool body may be moved through the slots 14 together with the attaching strap of the traction device and the means for coupling the tool body with said strap.

The means for coupling the tool body with the attaching strap include a relatively fixed inner coupling jaw 22 arranged at the front end of the pulling body 19 and preferably formed integrally therewith from the same strip of spring metal.

Along the outer side of the front part of the strip shaped pulling body is arranged a keeper of spring metal which includes a rear shank 23 which contacts the outer side of the body and is pivotally connected therewith by a rivet 24 so as to permit this keeper to swing laterally into and out of a position lengthwise of the body and an outer movable coupling jaw 25 which is offset from this shank and normally spaced from the fixed jaw 22 and connected with the shank by a web 26, as shown in Figs. 1, 2, 3, 4 and 6.

Figure 4:
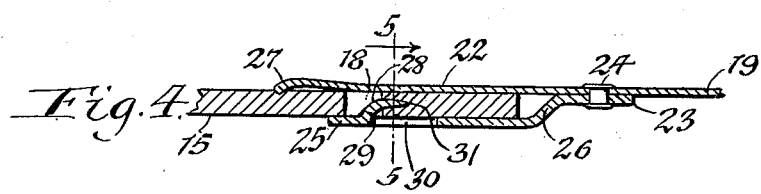
Fig. 4 is a vertical longitudinal section of the same taken on line 4—4, Fig. 6, but showing the same attached to the strap of a traction device.
Figure 5:
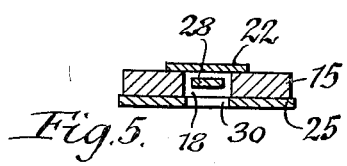
Fig. 5 is a cross section taken on line 5—5, Fig. 4.

The inner and outer jaws form a pair which are adapted to receive between them the free front end of the attaching strap of the traction device, as shown in Figs. 1, 4 and 5. The inner jaw projects some distance forwardly beyond the outer jaw and the front end of the inner jaw is inclined or curved outwardly toward the outer jaw, as shown at 27, so that when the coupling means of this tool are passed inwardly through a slot 14 and upwardly along the inner side of a tire shoe preparatory to connecting the applying tool to the strap of the traction device the incline 27 upon engaging any part of the perimeter of the wheel will act as a cam and deflect this jaw away from these parts of the wheel and thus avoid interference with the operations of connecting the applying tool with the traction device.

Means are provided for positively connecting this tool with the free end of the traction strap so that the latter will be compelled to move backwardly through the slot 14 of the wheel disk for drawing the traction device around the perimeter of the wheel.

This is preferably accomplished in accordance with the present inventions by a coupling hook 28 which is formed integrally with the movable jaw 25 by striking or stamping metal from the central part of this jaw inwardly therefrom and midway into the space between the outer and inner coupling jaws so as to form a hole 30 in the jaw 25 but leaving the front part of this hook connected at its base by a neck 29 with the adjacent part of the outer jaw while the point and beak 31 at the rear end of this hook projects rearwardly, as shown in Figs. 1, 2, 3, 4 and 6.

This hook is so located that when the attaching strap is placed between the coupling jaws the hook will enter the coupling hole or perforation in this strap and by thereafter pulling rearwardly on the tool the point 30 will enter or penetrate the traction strap at the rear part of the hole thereon and between the outer and inner flat sides of the strap, as best shown in Figs. 4 and 5.

By these means a firm and reliable connection is produced between the traction device and the applying tool which enables the strap of the traction device to be drawn with certainty through the slot of the wheel disk and this facilitates mounting the traction device in the wheel and renders this operation more convenient and less laborious this being particularly desirable in bad weather.

When using this applying tool the same is first passed forwardly through the slot in the wheel disk from the outer to the inner side of the latter and with the coupling jaws of this tool foremost. After the coupling jaws of the applying tool have passed through the slot in the disk a continued forward push on the tool will cause the coupling jaws to move upwardly on the inner side of the wheel and outwardly over the periphery of the same due to the curvature of the coiled spring strip body.

While in this position of the coupling jaws the free end of this traction strap is connected with the coupling jaws and then this strap is pulled backwardly through the disk slot until the gripping elements of the traction device are across the periphery of the wheel. The applying tool is then detached and the traction strap and buckle are connected for completing the mounting of the traction device on the wheel.

Figure 6:
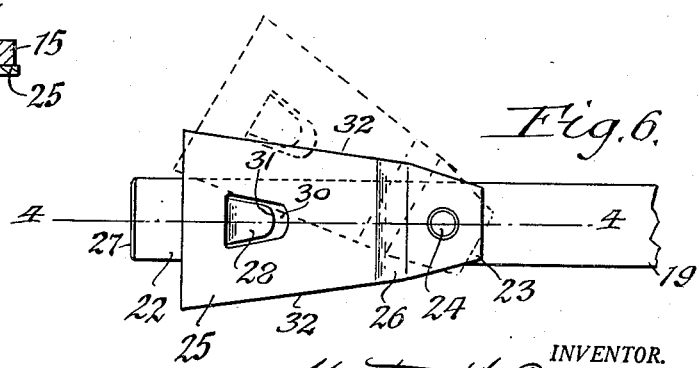
Fig. 6 is a plan view of the front part of the tool detached from the strap of a traction device.

The traction strap may be introduced between the coupling jaws preparatory to engaging the hook with the opening or hole in the strap by springing the jaws apart the required distance for this purpose, but if desired the strap may be connected with this hook after first swinging the outer jaw to one side of the inner jaw, as shown by dotted lines in Fig. 6, and thereafter returning the outer jaw over the companion inner jaw, as shown by full lines in the same figure.

Due to the coupling hook being arranged on the inner side of the outer jaw, the rearward pull on the applying tool causes this hook to be pressed against the outer side of the traction strap and hold the latter in firm engagement with the inner jaw, thereby preventing disconnection between the applying tool and the traction device during the operation of applying the latter to a wheel.

Figure 2:
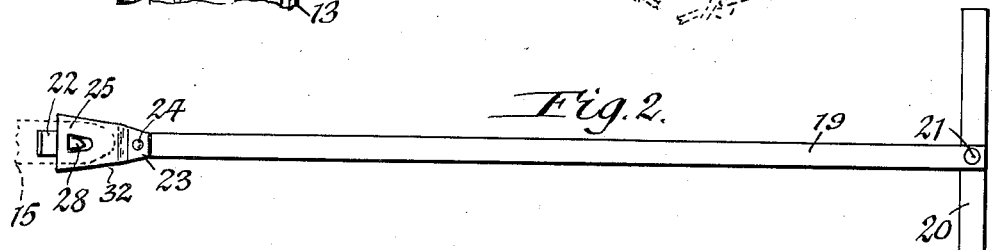
Fig. 2 is a plan view of the tool laid out flat.
Figure 3:
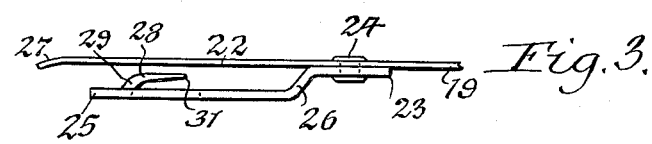
Fig. 3 is a side view on an enlarged scale, of the front part of the applying tool showing showing the means for attaching the same to the strap of a traction device.

The longitudinal edges 32 of the keeper forming the outer jaw and its shank are inclined relative to the longitudinal center of the same so that the keeper as a whole is of rearwardly converging or tapering form as shown in Figs. 2 and 6 and the keeper is also preferably made of such width that the same when connected with the traction strap will completely cover the latter thereby avoid projecting any part of the strap beyond the sides of the keeper and forming shoulders or corners thereon which might possibly catch on the inner side of the wheel disk while drawing the traction device and applying tool rearwardly through the slot in this disk.

By forming the coupling hook integrally with the respective jaw the construction is simplified, the cost is reduced. Moreover the coupling means of the applying tool are reduced in thickness and projections therein are avoided, thereby enabling the tool to be used on wheels in which the disks have comparatively narrow slots without liability of the applying tool becoming stuck in the same.

I claim as my invention:

A tool for applying to the perimeter of a wheel a traction device having a flexible strap provided with a perforation near one end thereof, comprising an elongated sheet metal strap, a sheet metal member overlying the flat side of one end of said sheet metal strap to provide a pair of substantially parallel jaws spaced apart a distance substantially equal to the thickness of said one end of said flexible strap and arranged to receive the same therebetween, the inner end of said member being offset from the jaw portion thereof toward said sheet metal strap and arranged thereagainst, a pivot pin connecting said inner offset end of said member and said sheet metal strap to permit said member to be swung laterally of said sheet metal strap, said inner end of said member being narrower than the width of said sheet metal strap, the lateral side edges of said member gradually flaring outwardly from said inner end thereof toward the opposite end thereof, the distance between said edges of said member in a transverse plane intersecting the end face of said one end of said flexible strap when arranged between said jaws being greater than the width of said one end of said flexible strap, and an offset hook integrally united to said jaw portion of said member and arranged wholly intermediate said jaws and having a beak projecting toward said inner end of said member and arranged to enter said perforation in said flexible strap and penetrate the corresponding side of the same.

MARTIN H. DOEBERT.

REFERENCES CITED

The following references are of record in the file of this patent:

UNITED STATES PATENTS

| Number | Name | Date |
|---|---|---|
| 2,128,286 | Davis | Aug. 30, 1938 |
| 2,234,902 | Keppel | Mar. 11, 1941 |
| 2,293,650 | Hudson | Aug. 18, 1942 |
| 2,438,547 | Doebert | Mar. 30, 1948 |